(12) United States Patent
Horiuchi et al.

(10) Patent No.: US 11,370,709 B2
(45) Date of Patent: Jun. 28, 2022

(54) CERAMIC MEMBER

(71) Applicant: SHINKO ELECTRIC INDUSTRIES CO., LTD., Nagano (JP)

(72) Inventors: Michio Horiuchi, Nagano (JP); Tomotake Minemura, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 163 days.

(21) Appl. No.: 16/735,859

(22) Filed: Jan. 7, 2020

(65) Prior Publication Data

US 2020/0231505 A1 Jul. 23, 2020

(30) Foreign Application Priority Data

Jan. 17, 2019 (JP) .............................. JP2019-006355

(51) Int. Cl.
*C04B 35/10* (2006.01)
*C04B 35/64* (2006.01)

(52) U.S. Cl.
CPC .............. *C04B 35/10* (2013.01); *C04B 35/64* (2013.01); *C04B 2235/3217* (2013.01); *C04B 2235/77* (2013.01)

(58) Field of Classification Search
CPC . C04B 35/10; C04B 35/64; C04B 2235/3217; C04B 2235/77
See application file for complete search history.

(56) References Cited

U.S. PATENT DOCUMENTS

| 5,604,018 A | 2/1997 | Horiuchi et al. |
| 2012/0267141 A1* | 10/2012 | Kamiyama ........... C22C 47/062 174/102 R |
| 2018/0130724 A1* | 5/2018 | Kimura ................. H01L 21/561 |
| 2018/0137950 A1* | 5/2018 | Xia ....................... H01F 41/061 |

FOREIGN PATENT DOCUMENTS

| JP | S62-260373 | 11/1987 |
| JP | S63253656 | * 10/1988 |
| JP | H07-015101 | 1/1995 |
| JP | 2005-223185 | 8/2005 |
| JP | 2007254181 | * 10/2007 |

OTHER PUBLICATIONS

JPS63253656 machine translation via EspaceNet (Year: 1988).*
JP2007254181 machine translation via EspaceNet (Year: 2007).*
Bernhard, Frank, et al. "Application of self-calibrating thermocouples with miniature fixed-point cells in a temperature range from 500 C to 650 C in steam generators." Proc. XVII IMEKO World Congress on Metrology in the 3rd Millenium. 2003. (Year: 2003).*

* cited by examiner

*Primary Examiner* — Karl E Group
*Assistant Examiner* — Cameron K Miller
(74) *Attorney, Agent, or Firm* — IPUSA, PLLC (57) ABSTRACT

A ceramic member includes: a ceramic sintered body; and a conductive member of aluminum or an aluminum alloy provided in the sintered body.

4 Claims, 11 Drawing Sheets

CERAMIC MEMBER

CROSS-REFERENCE TO RELATED APPLICATION

This application is based upon and claims priority to Japanese Patent Application No. 2019-006355, filed on Jan. 17, 2019, the entire contents of which are incorporated herein by reference.

FIELD

The present disclosure relates to a ceramic member.

BACKGROUND

It is proposed to use a composite material of ceramic and a conductive material for an electrostatic chuck, a wiring substrate, a piezoelectric actuator or the like. The composite material of ceramic and a conductive material is manufactured as follows. First, a metal powder having a melting point higher than the temperature at which ceramic is to be sintered is pasted and applied to the surface of a ceramic green sheet. A plurality of such green sheets are prepared, layered with each other, and sintered in a reducing atmosphere. In this manner, the composite material can be manufactured. As a metal, tungsten or molybdenum is mainly used. Also, Patent Document 1 proposes a method of using copper as a metal for the purpose of reducing resistance.

RELATED-ART DOCUMENTS

Patent Documents

[Patent Document 1] Japanese Laid-open Patent Publication No. 7-015101
[Patent Document 2] Japanese Laid-open Patent Publication No. 2005-223185
[Patent Document 3] Japanese Laid-open Patent Publication No. S62-260373

However, the melting point of copper is significantly lower than a temperature suitable for degreasing and sintering green sheets. Therefore, in a case where copper is used, a process such as degreasing and sintering is required to be performed for a long time which results in an increase in cost.

One aspect of the present disclosure is to provide a ceramic member so that it is possible to reduce the electrical resistance of a conductive material, while preventing an increase in cost.

SUMMARY

According to one aspect of the present disclosure, a ceramic member includes: a ceramic sintered body; and a conductive member of aluminum or an aluminum alloy provided in the sintered body.

The object and advantages of the invention will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENTS

The inventors of the present invention have focused on aluminum as a conductive material whose electrical resistance is low. However, the melting point of aluminum is 660° C., which is low. Therefore, in a conventional method of using a paste of powder of tungsten or molybdenum, it is not possible to use aluminum instead of the paste of powder of tungsten or molybdenum. The inventors of the present invention have diligently investigated methods of using bulk aluminum. As a result, the inventors of the present invention have found that, by using predetermined ceramic green sheets, a ceramic member can be appropriately manufactured using a bulk aluminum or aluminum alloy.

In the following, the embodiments will be described with reference to the accompanying drawings. Note that in the specification and the drawings, substantially same constituent elements may be referred to by the same reference numerals, and duplicate descriptions may be omitted as appropriate.

First Embodiment

Figure 1A:
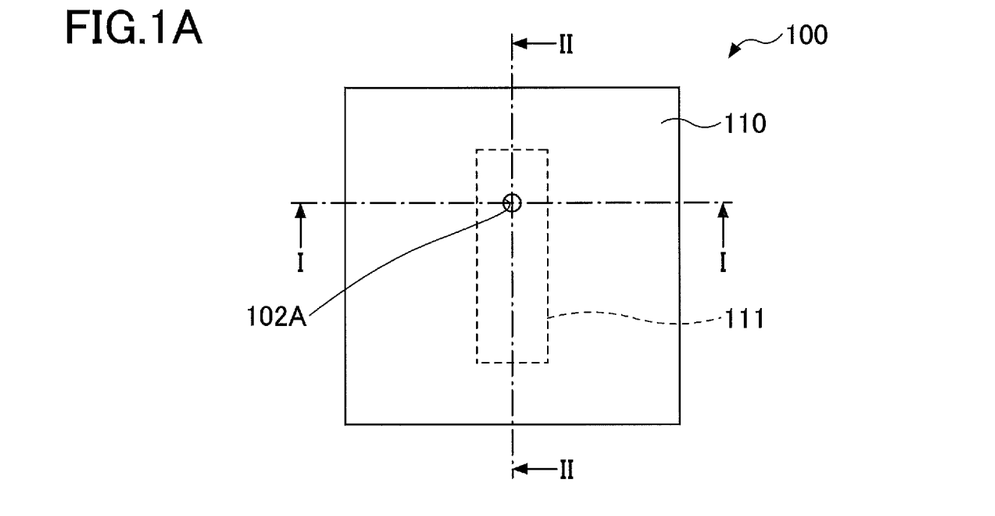
FIGS. 1A to 1C are diagrams illustrating a ceramic member according to a first embodiment.
Figure 1B:
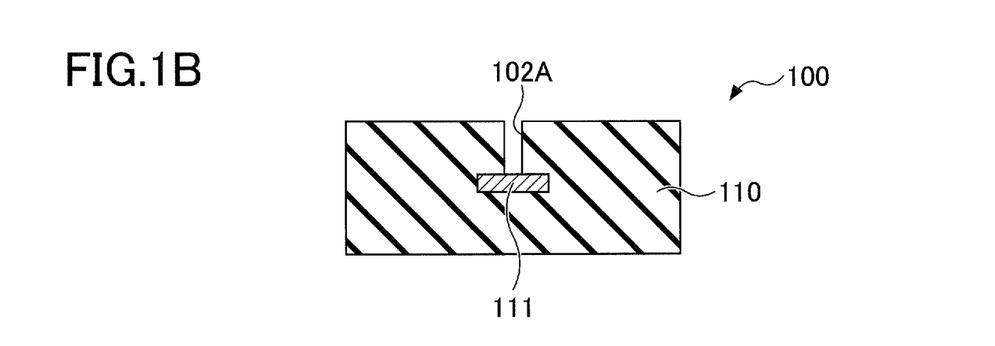
Figure 1C:
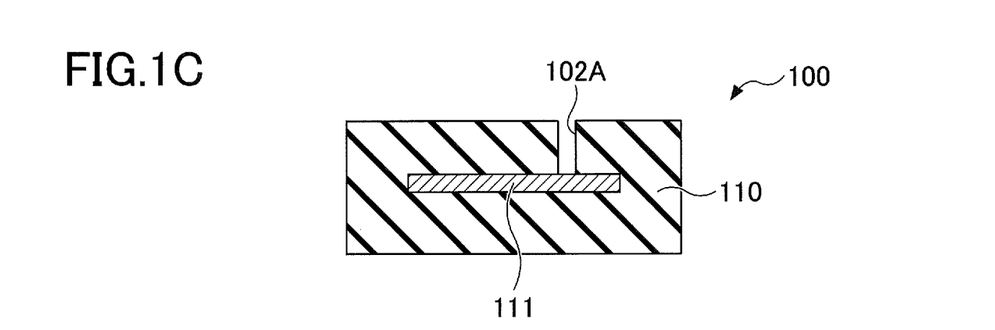

First, a first embodiment will be described. The first embodiment relates to a ceramic member. FIGS. 1A to 1C are diagrams illustrating a ceramic member 100 according to the first embodiment. FIG. 1A is a plan view, FIG. 1B is a cross-sectional view taken along line I-I in FIG. 1A, and FIG. 1C is a cross-sectional view taken along line II-II in FIG. 1A.

As illustrated in FIGS. 1A to 1C, the ceramic member 100 according to the first embodiment includes a ceramic sintered body 110 and a conductive member 111 of aluminum or an aluminum alloy provided in the sintered body 110. A hole 102A that reaches the conductive member may be formed in the sintered body 110.

In the ceramic member 100 configured as described above, the electrical resistivity of the conductive member 111 can be made lower than the electrical resistivity of a conductive member formed using a paste of powder of tungsten or molybdenum. Also, the thermal conductivity of the conductive member 111 can be made higher than the thermal conductivity of a conductive member formed using a paste of powder of tungsten or molybdenum. For example, tungsten has an electrical resistivity of 52.8 nΩm and a thermal conductivity of 173 W/(mK), while aluminum has an electrical resistivity of 28.2 nΩm and a thermal conductivity of 237 W/(mK).

Further, according to a method that will be described later below, the ceramic member 100 can be manufactured without degreasing and sintering for a long time, and an increase in cost can be suppressed.

The relative density of the sintered body 110 is preferably greater than or equal to 90% and is more preferably greater than or equal to 95%. If the relative density of the sintered body 110 is less than 90%, the probability that a continuous pore is formed is high, and penetration and vaporization loss of the aluminum or aluminum alloy that is material of the conductive member 111 are likely to occur.

It is preferable that the sintered body 110 is made of a material that does not easily chemically react with aluminum or an aluminum alloy. For example, the sintered body 110 preferably includes 96% or more by mass of aluminum oxide ($Al_2O_3$), and more preferably includes 99% or more by mass of aluminum oxide. Silicon oxide ($SiO_2$), magnesium oxide (MgO), and calcium oxide (CaO) are more likely to react chemically with aluminum or an aluminum alloy than with aluminum oxide. Accordingly, the total amount of silicon oxide, magnesium oxide, and calcium oxide is preferably less than or equal to 4% by mass of the sintered body 110, and is more preferably less than or equal to 1% by mass.

Figure 2A:
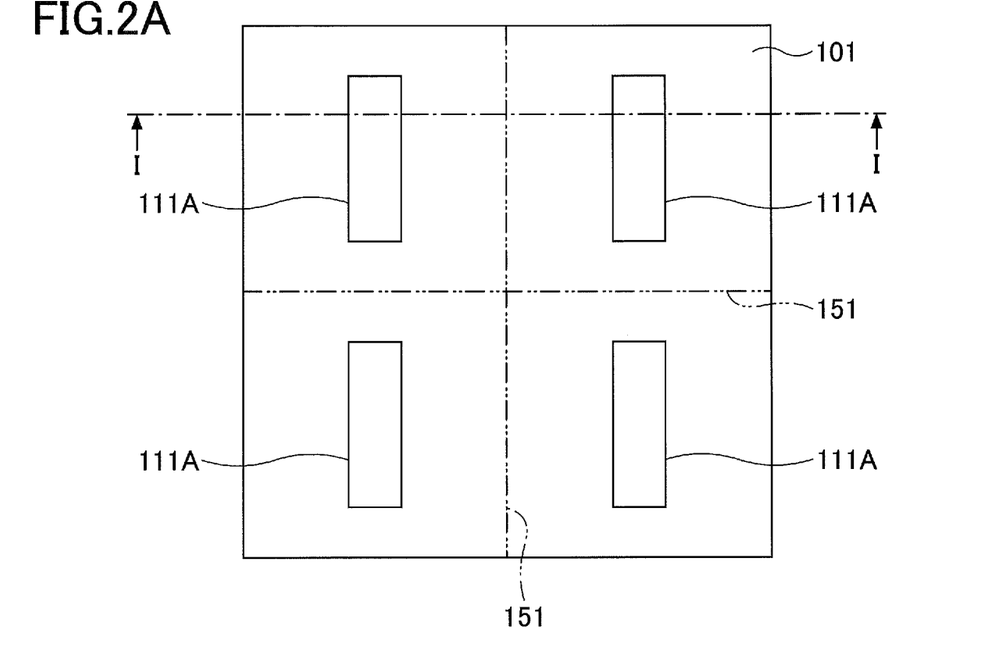
FIGS. 2A and 2B are plan views illustrating a method of manufacturing ceramic members according to the first embodiment (part 1)
Figure 2B:
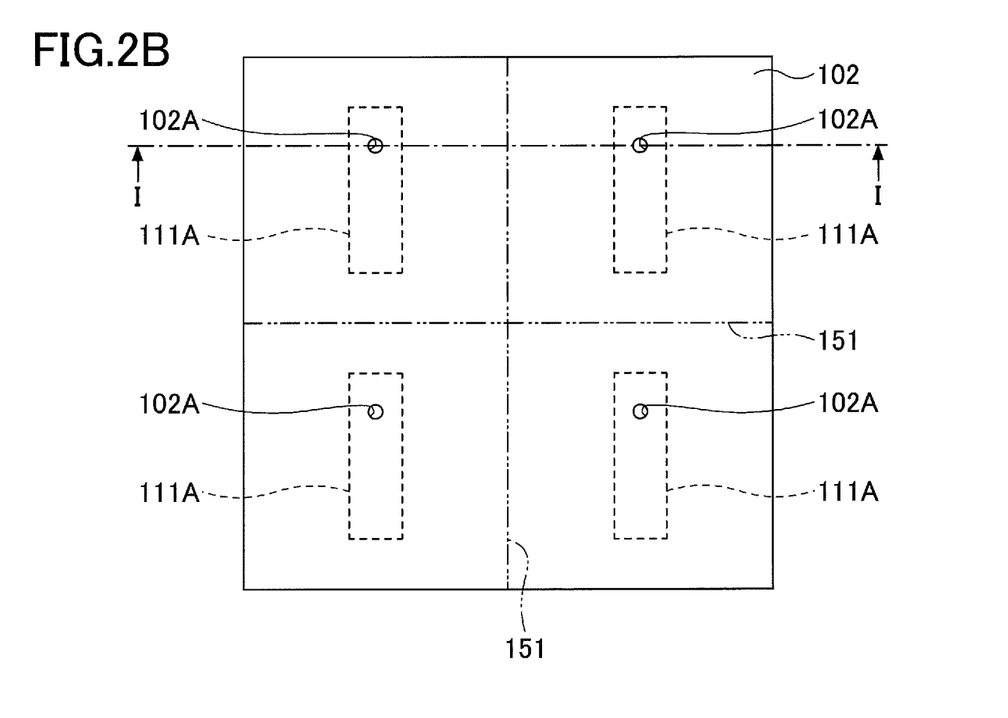
Figure 3A:
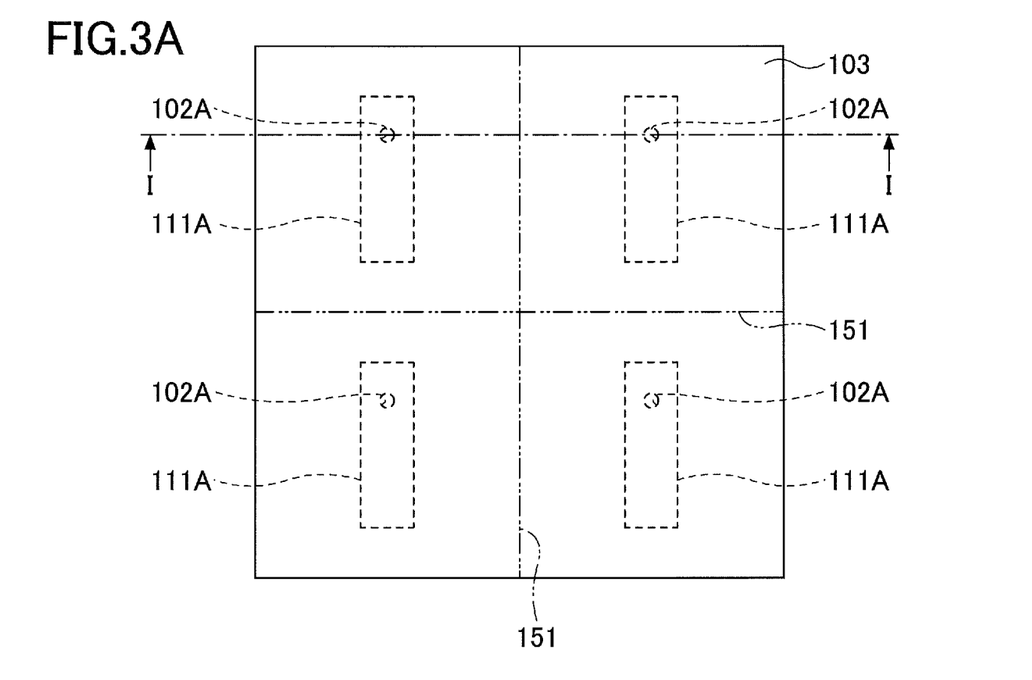
FIGS. 3A and 3B are plan views illustrating the method of manufacturing the ceramic members according to the first embodiment (part 2)
Figure 3B:
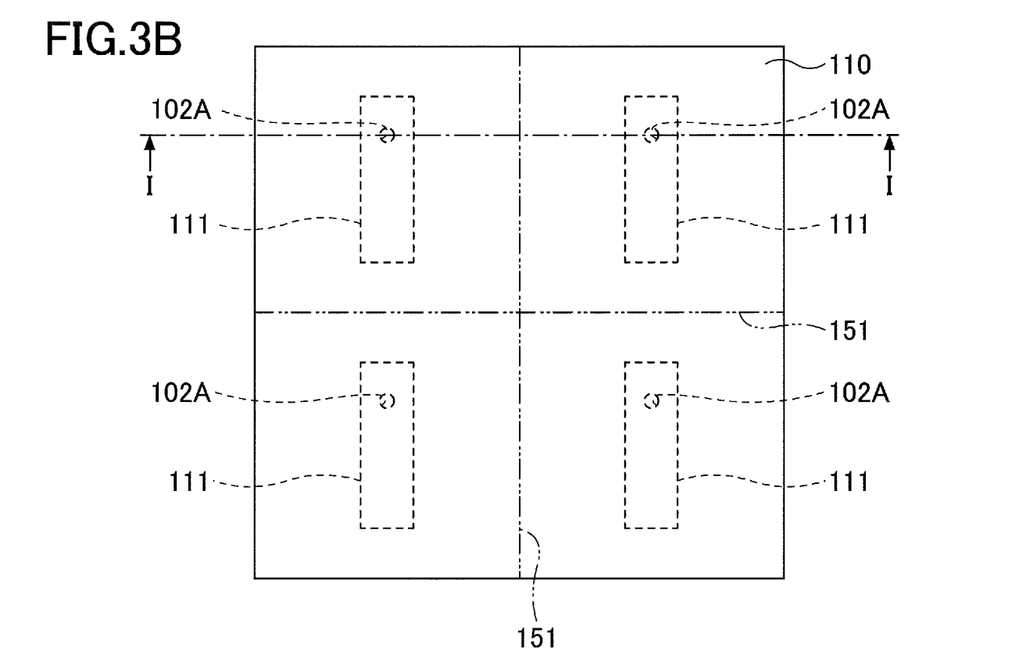
Figure 4A:
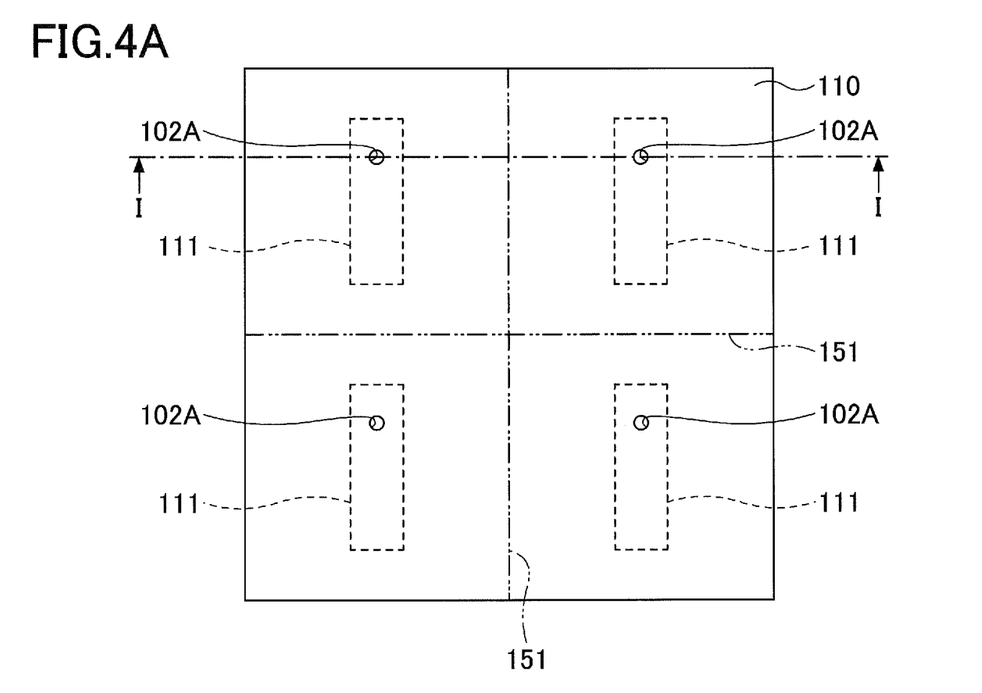
FIGS. 4A and 4B are plan views illustrating the method of manufacturing the ceramic members according to the first embodiment (part 3)
Figure 4B:
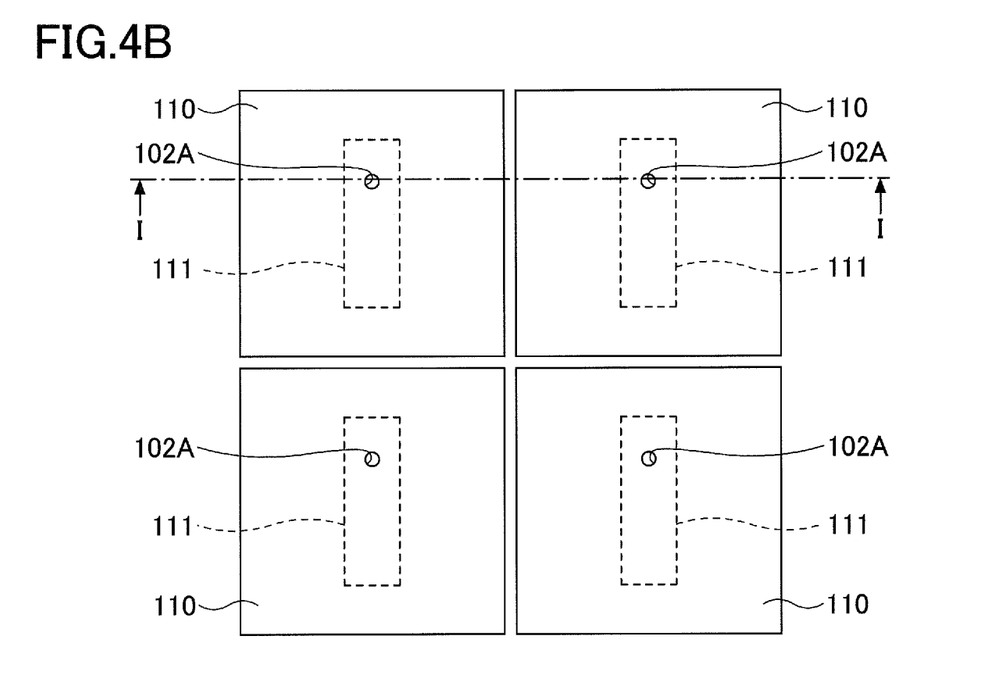
Figure 5A:
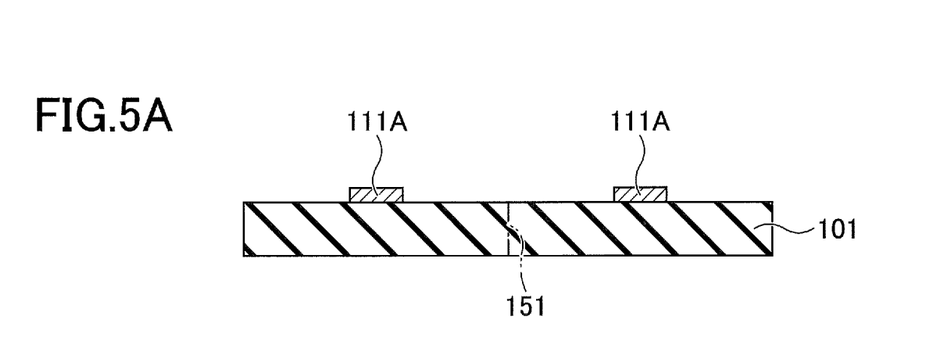
FIGS. 5A to 5C are cross-sectional views illustrating the method of manufacturing the ceramic members according to the first embodiment (part 1)
Figure 5B:
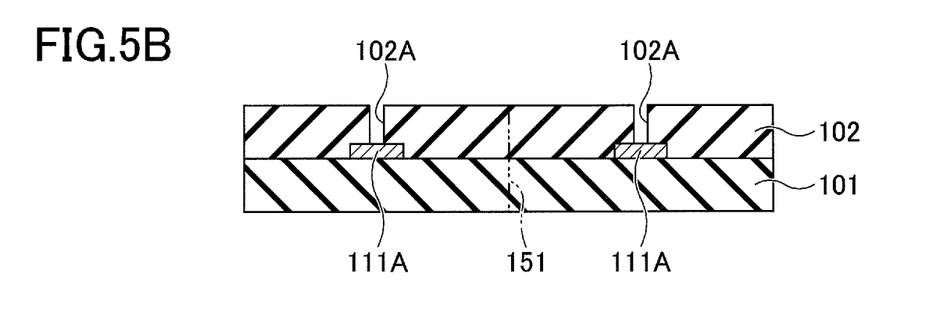
Figure 5C:
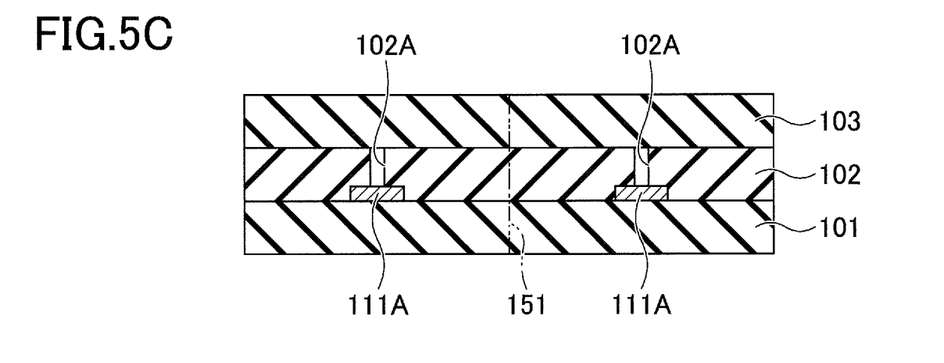
Figure 6A:
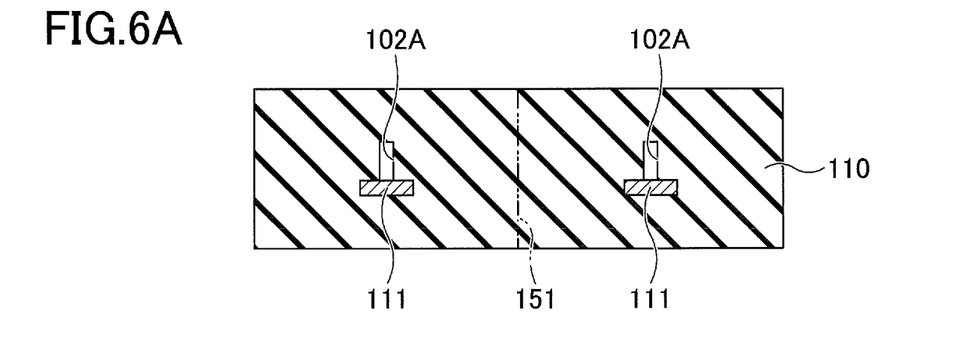
FIGS. 6A to 6C are cross-sectional views illustrating the method of manufacturing the ceramic members according to the first embodiment (part 2)
Figure 6B:
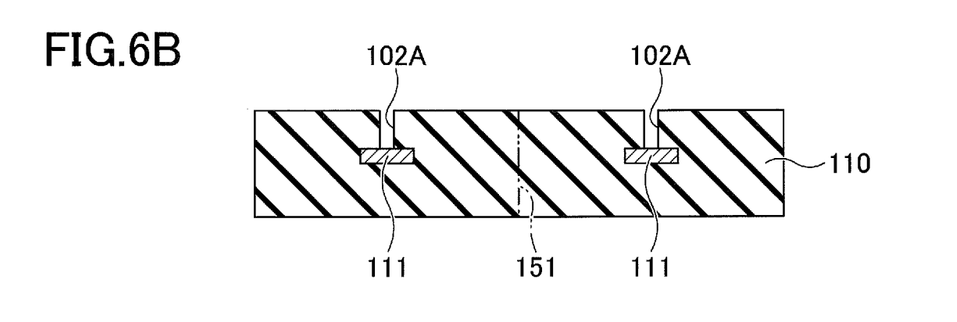
Figure 6C:
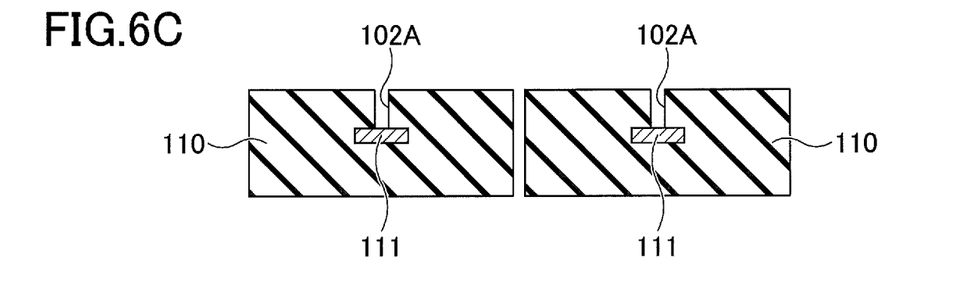

Next, a method of manufacturing ceramic members 100 according to the first embodiment will be described. FIGS. 2 to 4 are plan views illustrating a method of manufacturing ceramic members according to the first embodiment, and FIGS. 5 and 6 are cross-sectional views illustrating the method of manufacturing the ceramic members according to the first embodiment. FIGS. 5 and 6 correspond to cross-sectional views taken along line I-I in FIGS. 2 to 4.

First, a first green sheet 101 is prepared, as illustrated in FIG. 2A and FIG. 5A. As the first green sheet 101, for example, a large size green sheet is used so that four ceramic members 100 can be obtained. That is, the first green sheet 101 has four areas for forming structures corresponding to the ceramic members 100. These areas are later split by being cut along cut lines 151. The same applies to a second green sheet 102 and a third green sheet 103, which will be described later below. Next, bulk metal films 111A of aluminum or an aluminum alloy are provided on the first green sheet 101. Metal foil may be used as the metal films 111A.

Thereafter, as illustrated in FIG. 2B and FIG. 5B, a second green sheet 102 having holes 102A that reach the metal films 111A is provided on the first green sheet 101.

Subsequently, as illustrated in FIG. 3A and FIG. 5C, a third green sheet 103 is provided on the second green sheet 102. The holes 102A are sealed by the third green sheet 103. According to the present embodiment, a layered structure of the second green sheet 102 and the third green sheet 103 is an example of a second green sheet and the holes 102A are an example of a void. A void may be formed on one or both a first green sheet and a second green sheet. In either case, the first green sheet and the second green sheet are layered each other to occlude this void.

Subsequently, as illustrated in FIG. 3B and FIG. 6A, the first green sheet 101, the second green sheet 102 and the third green sheet 103 are heated and pressed to be integrated. Thereafter, by performing sintering, the sintered body 110 is obtained. At the time of this sintering, the metal films 111A melt and solidify such that the conductive members 111 are obtained.

Due to the sintering, the first green sheet 101, the second green sheet 102, and the third green sheet 103 are substantially isotropically densified. Therefore, the volume of the sintered body 110 becomes smaller than the total volume of the first green sheet 101, the second green sheet 102, and the third green sheet 103. On the other hand, the volume of the conductive members 111 is equal to the volume of the bulk metal films 111A. According to the present embodiment, the holes 102A are formed in the second green sheet 102, and the contraction of the sintered body 110 is completed while the metal films 111A are melted. Accordingly, a portion of the molten metal enters the holes 102A and solidifies. As a result, generation of internal stress due to the contraction of the sintered body 110 is prevented.

After sintering, the holes 102A are exposed by grinding and polishing the sintered body 110 as illustrated in FIG. 4A and FIG. 6B.

As illustrated in FIG. 4B and FIG. 6C, the sintered body 110 is then cut along the cut lines 151 to be separated.

In this manner, the ceramic members 100 according to the first embodiment can be manufactured.

According to the manufacturing method described above, at the time of sintering the first green sheet 101, the second green sheet 102, and the third green sheet 103 that are integrated, the conductive members 111 can be obtained from the metal films 111A. That is, a special process for obtaining the conductive members 111 such as a long-time process of degreasing and sintering is not required. Therefore, it is possible to suppress an increase in the manufacturing cost. Further, because the holes 102A are formed in the second green sheet 102, it is possible to prevent generation of internal stress even when the volume of ceramic contracts due to the sintering.

Further, although an inclusion is mixed in a conductive member in a conventional method of using a paste of metal powder, according to the present manufacturing method, because the bulk metal films 111A can be used, it is possible to prevent an increase in the electrical resistivity and a decrease in the thermal conductivity due to an inclusion being mixed.

For each of the first green sheet 101, second green sheet 102, and third green sheet 103, the percentage of aluminum oxide in ceramic constituting the green sheet is preferably greater than or equal to 96% by mass and is more preferably greater than or equal to 99% by mass. This is for suppressing chemical reactions of the ceramic with aluminum or an aluminum alloy.

The temperature of the sintering to obtain the sintering body 110 may be greater than or equal to than the melting point of the metal films 111A, and is preferably greater than or equal to 700° C. Depending on the materials of the first green sheet 101, the second green sheet 102, and the third green sheet 103, the sintering temperature is preferably greater than or equal to 1300° C. Also, at a sintering temperature exceeding 1600° C., a chemical reaction easily occurs between molten metal and ceramic. Therefore, it is preferable that the sintering temperature is less than or equal to 1600° C.

It is preferable that the atmosphere of sintering to obtain the sintered body 110 is an oxidizing atmosphere, such as an air atmosphere. On the surface of the solid aluminum or aluminum alloy, a dense oxide film, which is a passivation film, is formed. However, when the aluminum or aluminum alloy is heated to greater than or equal to the melting point, the oxide film is broken due to the melting of the aluminum or aluminum alloy and, in a vacuum atmosphere or a reducing atmosphere, the molten metal evaporates as the temperature rises. In particular, at a temperature greater than or equal to 1200° C., the vapor pressure rises significantly and the evaporation loss is large. On the other hand, in an oxidizing atmosphere such as an atmosphere, even when the oxide film breaks, a new oxide film is quickly formed. Therefore, evaporation loss of the aluminum or aluminum alloy can be suppressed.

In the present embodiment, breakage and reformation of the oxide film as described above may mainly occur at portions of the metal films 111A that are exposed to the holes 102A. As the range where breakage and reformation of the oxide film occur is broader, the oxidation loss of metal increases. However, according to the present embodiment, because the range where breakage and reformation of the oxide film occur is limited, the oxidation loss of the aluminum or the aluminum alloys can be suppressed.

By sintering in an air atmosphere, organic components contained in the first green sheet 101, the second green sheet 102, and the third green sheet 103 can be rapidly removed. By removing the organic components, an effect on ceramic properties of residual carbon can be suppressed. In addition, for sintering in an air atmosphere, atmospheric control gas such as hydrogen, nitrogen, or ammonia decomposition gas is not required. Furthermore, in comparison to a vacuum atmosphere and a reducing atmosphere, an air atmosphere is easily managed and has an advantage in low facility cost.

The number of ceramic members 100 obtained from the layered structure of the first green sheet 101, the second green sheet 102 and the third green sheet 103 is not limited to four. For example, one ceramic member 100 may be manufactured without cutting the layered structure of the first green sheet 101, the second green sheet 102 and the third green sheet 103.

The hole 102A is not required to be exposed in a ceramic member 100 as an end product, and a conductive path with the conductive member 111 may be formed by a user of the ceramic member 100. Communication using capacitance with the conductive members 111 may be performed. Alternatively, the holes 102A may be filled with a material such as a conductive material or a ceramic material.

Figure 7A:
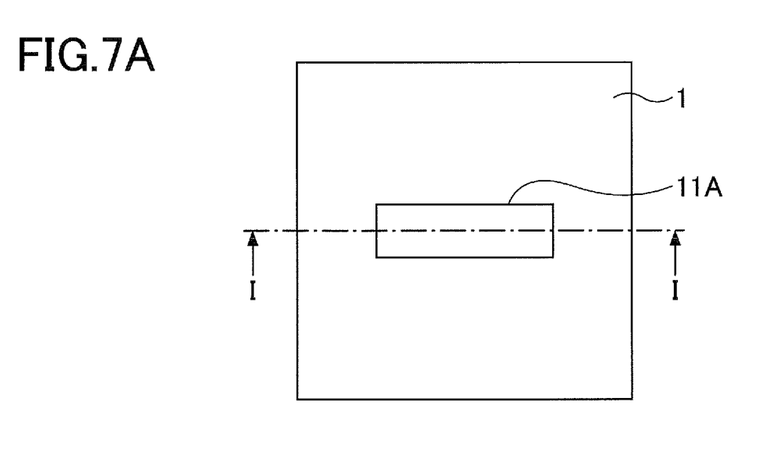
FIGS. 7A and 7B are plan views illustrating a method of manufacturing a ceramic member in an experiment with respect to the first embodiment (part 1)
Figure 7B:
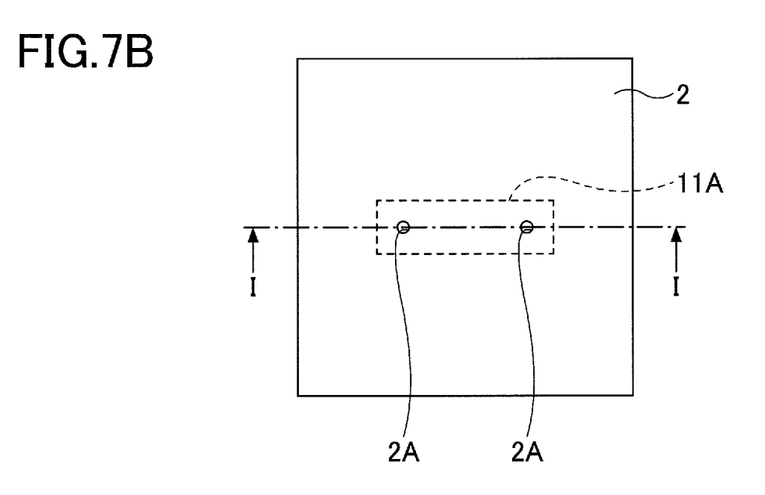
Figure 8A:
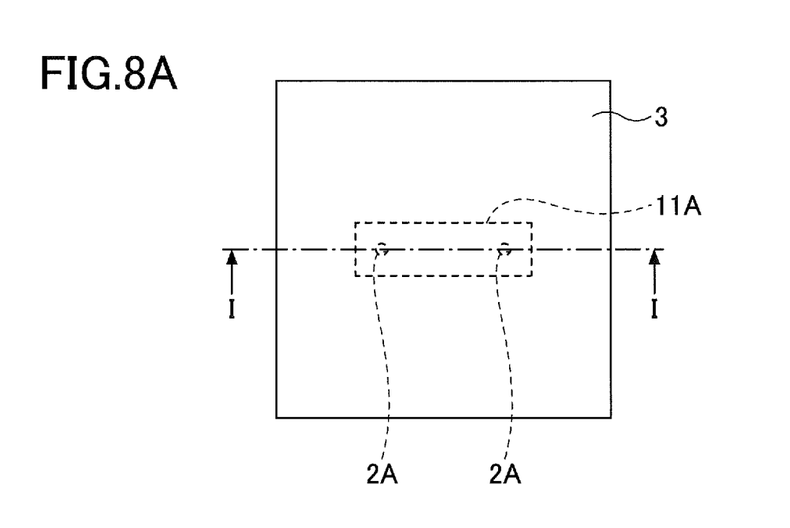
FIGS. 8A and 8B are plan views illustrating the method of manufacturing the ceramic member in the experiment with respect to the first embodiment (part 2)
Figure 8B:
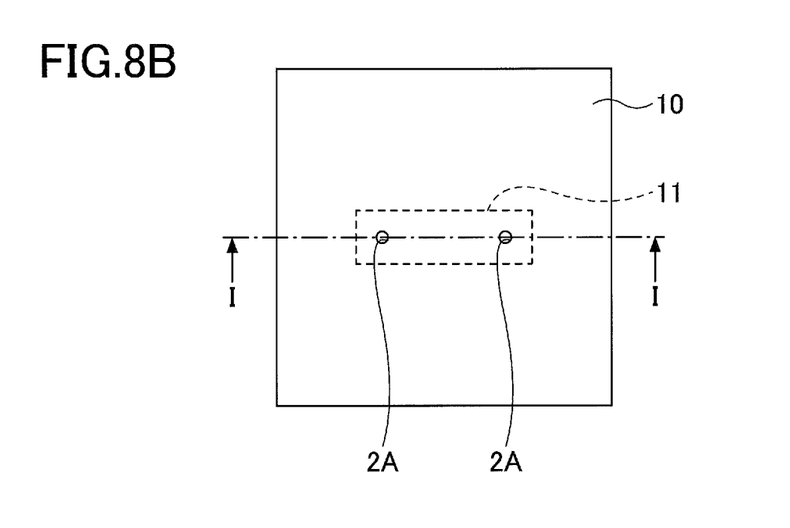
Figure 9A:
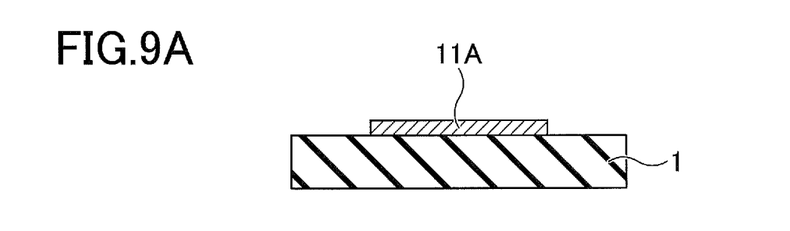
FIGS. 9A to 9C are cross-sectional views illustrating the method of manufacturing the ceramic member in the experiment with respect to the first embodiment (part 1)
Figure 9B:
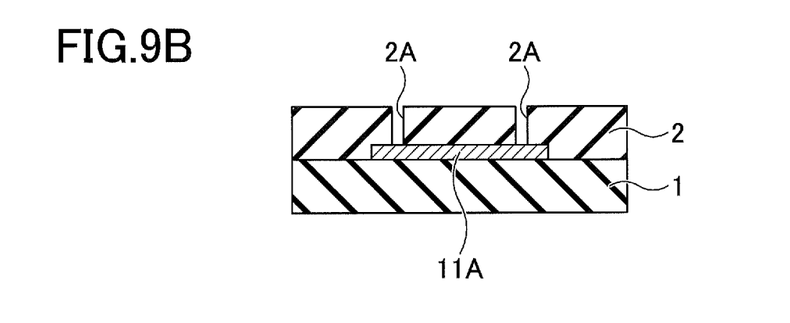
Figure 9C:
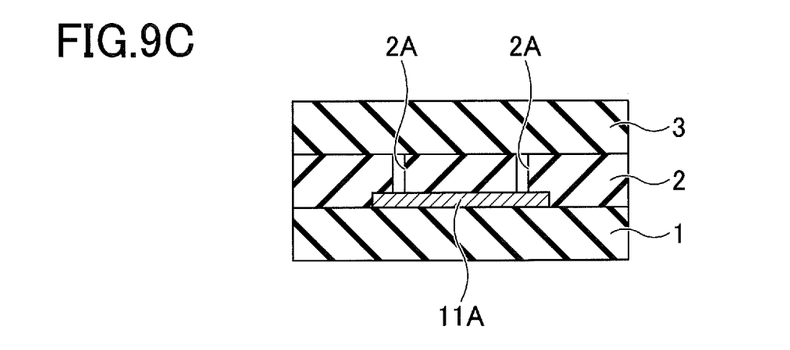
Figure 10A:
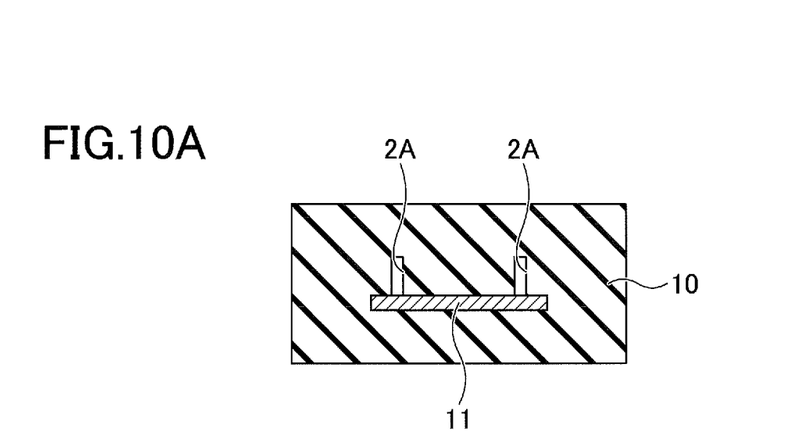
FIGS. 10A and 10B are cross-sectional views illustrating the method of manufacturing the ceramic member in the experiment with respect to the first embodiment (part 1)
Figure 10B:
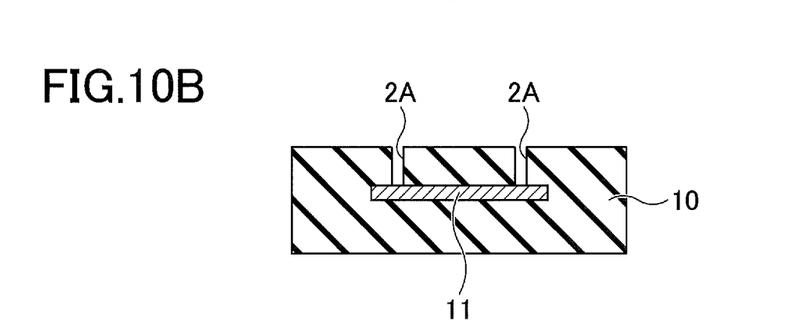

Here, an experiment conducted by the inventors with respect to the first embodiment will be described. FIGS. 7 and 8 are plan views illustrating a method of manufacturing a ceramic member in the experiment with respect to the first embodiment. FIGS. 9 and 10 are cross-sectional views illustrating the method of manufacturing the ceramic member in the experiment with respect to the first embodiment. FIGS. 9 and 10 correspond to cross-sectional views taken along line I-I in FIGS. 7 and 8.

In this experiment, first, a first green sheet 1 was formed by a doctor blade method, as illustrated in FIG. 7A and FIG. 9A. The first green sheet 1 was formed by using a slurry obtained by mixing an alumina powder with an average particle diameter of 1 μm or less, polyvinyl butyral, dibutyl phthalate, 2-propanol, and ethyl acetate in a ball mill. The thickness of the first green sheet 1 was about 0.5 mm. A second green sheet 2 and a third green sheet 3, which will be described later below, were also made in a similar manner and the thicknesses of the second green sheet 2 and the third green sheet 3 were also about 0.5 mm. Then, aluminum foil 11A having a thickness of about 0.03 mm was provided on the first green sheet 1. The planar shape of the aluminum foil 11A was a rectangle of 30 mm×10 mm.

Thereafter, as illustrated in FIG. 7B and FIG. 9B, the second green sheet 2 having two holes 2A that reach the aluminum foil 11A was provided on the first green sheet 1. The hole diameter was 3 mm.

Subsequently, as illustrated in FIG. 8A and FIG. 9C, the third green sheet 3 was provided on the second green sheet 2, and the holes 2A were sealed by the third green sheet 3.

Subsequently, as illustrated in FIG. 10A, the first green sheet 1, the second green sheet 2, and the third green sheet 3 were heated and pressed to be integrated. Thereafter, by performing sintering in air atmosphere at 1500° C., a sintered body 10 was obtained. At the time of this sintering, the aluminum foil 11A melted and solidified such that a conductive member 11 was obtained.

Subsequently, as illustrated in FIG. 8B and FIG. 10B, the holes 2A were exposed by grinding and polishing the sintered body 10.

Then, the electrical resistance of the conductive member 11 was measured using a two-terminal type simple resistance tester including contact resistance. The electrical resistance of the conductive member 11 was 0.3 mΩ, which is sufficiently low.

Second Embodiment

Figure 11:
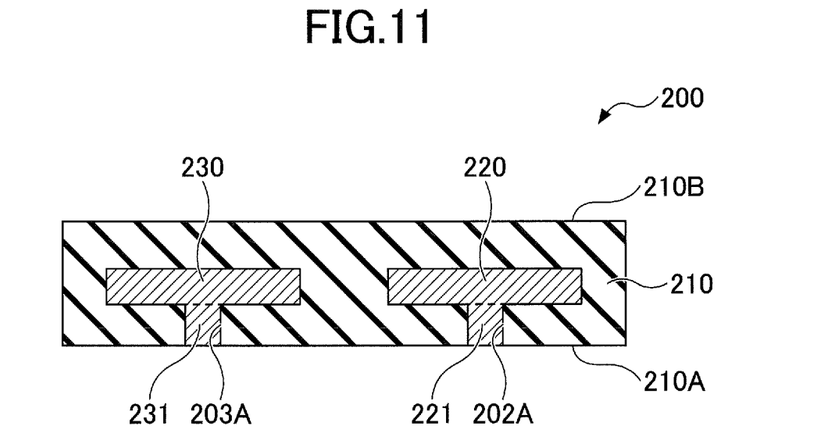
FIG. 11 is a cross-sectional view illustrating an electrostatic chuck according to a second embodiment.

Next, a second embodiment will be described. The second embodiment relates to an electrostatic chuck including a ceramic member. FIG. 11 is a cross-sectional view illustrating an electrostatic chuck 200 according to the second embodiment.

As illustrated in FIG. 11, the electrostatic chuck 200 according to the second embodiment includes a ceramic sintered body 210, an electrostatic electrode 220 of aluminum or an aluminum alloy provided in the sintered body 210, and an electrostatic electrode 230 of aluminum or an aluminum alloy provided in the sintered body 210. A hole 202A reaching the electrostatic electrode 220 and a hole 203A reaching the electrostatic electrode 230 are formed on one surface 210A of the sintered body 210. A via conductor 221 connected to the electrostatic electrode 220 is provided in the hole 202A, and a via conductor 231 connected to the electrostatic electrode 230 is provided in the hole 203A.

According to the electrostatic chuck 200 configured as described above, through the via conductors 221 and 231, a positive voltage is applied to one of the electrostatic electrodes 220 and 230 and a negative voltage is applied to the other of the electrostatic electrodes 220 and 230. As a result, a surface 210B, which is the opposite surface of the surface 210A on which the holes 202A and 203A are formed, is charged, and an object such as a semiconductor wafer is adsorbed onto the surface 210B.

In the electrostatic chuck 200, the electrical resistivity of the electrostatic electrodes 220 and 230 can be made lower than the electrical resistivity of electrostatic electrodes formed using a paste of powder of tungsten or molybdenum. Also, the thermal conductivity of the electrostatic electrodes 220 and 230 can be made higher than the thermal conductivity of a conductive member formed using a paste of powder of tungsten or molybdenum.

Further, similarly to the ceramic member 100, the electrostatic chuck 200 can be manufactured without degreasing and sintering for a long time, and an increase in cost can be suppressed.

The relative density of the sintered body 210 is preferably greater than or equal to 90% and is more preferably greater than or equal to 95%. If the relative-density of the sintered body 210 is less than 90%, the probability that a continuous pore is formed is high, and penetration and vaporization loss of the aluminum or aluminum alloy that is material of the electrostatic electrodes 220 and 230 are likely to occur.

It is preferable that the sintered body 210 is made of a material that does not easily chemically react with aluminum or an aluminum alloy. For example, the sintered body 210 preferably includes 96% or more by mass of aluminum oxide, and more preferably includes 99% or more by mass of aluminum oxide.

In manufacturing the electrostatic chuck 200, for example, by a method similar to the method of manufacturing the ceramic member 100, a process can be performed to grind and polish the sintered body 210 to expose the holes 202A and 203A. Thereafter, the via conductor 221 can be formed in the hole 202A and the via conductor 231 can be formed in the hole 203A.

Depending on the size of the holes 202A and 203A, aluminum or an aluminum alloy entering the holes 202A and 203A and solidified due to volume contraction of ceramic can also be used as via conductors 221 and 231.

Third Embodiment

Figure 12:
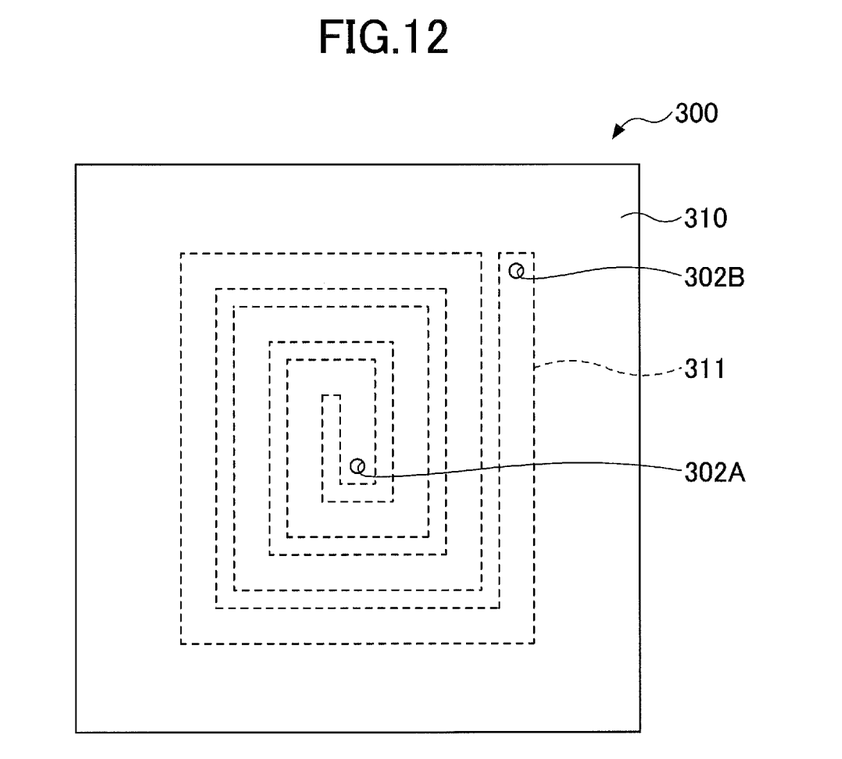
FIG. 12 is a plan view illustrating an inductor according to a third embodiment.

Next, a third embodiment will be described. A third embodiment relates to an inductor including a ceramic member. FIG. 12 is a plan view illustrating an inductor 300 according to the third embodiment.

As illustrated in FIG. 12, the inductor 300 according to the third embodiment includes a ceramic sintered body 310 and a conductive member 311 of aluminum or an aluminum alloy provided in the sintered body 310. The planar shape of the conductive member 311 is helical. A hole 302A reaching one end of the conductive member 311 and a hole 302B reaching the other end of the conductive member 311 are formed on one surface of the sintered body 310.

The inductor 300 configured as described above can be electrically connected to an external circuit through the holes 302A and 302B.

In the inductor 300, the electrical resistivity of the conductive member 311 can be made lower than the electrical resistivity of a conductive member formed using a paste of powder of tungsten or molybdenum. Also, the thermal conductivity of the conductive member 311 can be made higher than the thermal conductivity of a conductive member formed using a paste of powder of tungsten or molybdenum.

Further, similarly to the ceramic member 100, the inductor 300 can be manufactured without degreasing and sintering for a long time, and an increase in cost can be suppressed.

The relative density of the sintered body 310 is preferably greater than or equal to 90% and is more preferably greater than or equal to 95%. If the relative density of the sintered body 310 is less than 90%, the probability that a continuous pore is formed is high, and penetration and vaporization loss of the aluminum or aluminum alloy that is material of the conductive member 111 are likely to occur.

It is preferable that the sintered body 310 is made of a material that does not easily chemically react with aluminum or an aluminum alloy. For example, the sintered body 310 preferably includes 96% or more by mass of aluminum oxide, and more preferably includes 99% or more by mass of aluminum oxide.

In manufacturing the inductor 300, for example, by a method similar to the method of manufacturing the ceramic member 100, a process can be performed up to grind and polish the sintered body 310 to expose the holes 302A and 303A.

Although the preferred embodiments have been described above in detail, the present invention is not limited to the embodiments described above, and various variations and modifications may be made with respect to the embodiments described above without departing from the scope of the present invention.

For example, although a ceramic member is applied in an electrostatic chuck in the second embodiment and a ceramic member is applied in an inductor in the third embodiment, the applications of ceramic members are not limited. For example, a ceramic member may be used for a mounting board such as a power semiconductor device.

Various aspects of the subject-matter described herein may be set out non-exhaustively in the following numbered clauses:

1. A method of manufacturing a ceramic member, the method including:
sandwiching a metal film of aluminum or an aluminum alloy by a first green sheet and a second green sheet; and
sintering the first green sheet and the second green sheet at a temperature greater than or equal to a melting point of the metal film to obtain a ceramic sintered body,
wherein a void is provided in a portion of a surface, which is in contact with the metal film, of one or both of the first green sheet and the second green sheet.

2. The method of clause 1,
wherein the sintering is performed in an oxidizing atmosphere.

3. The method of clause 2,
wherein the sintering is performed in an air atmosphere.

4. The method of any one of clauses 1 to 3,
wherein the sintering is performed at a temperature greater than or equal to 700° C. and less than or equal to 1600° C.

5. The method of clause 4,
wherein the sintering is performed at a temperature greater than or equal to 1300° C. and less than or equal to 1600° C.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:
1. A ceramic member comprising:
a ceramic sintered body; and
a conductive member of aluminum or an aluminum alloy provided in the sintered body,
wherein 96% by mass or more of ceramic constituting the sintered body is aluminum oxide, and wherein the conductive member has a first flat surface and a second flat surface opposite to the first flat surface, and the first flat surface and the second flat surface are in contact with the ceramic sintered body such that the conductive member is sandwiched between portions of the ceramic sintered body.

2. The ceramic member according to claim 1, wherein a hole that reaches the conductive member is formed in the sintered body.

3. The ceramic member according to claim 1, wherein a relative density of the sintered body is greater than or equal to 90%.

4. The ceramic member according to claim 1, wherein the conductive member is a sheet of aluminum or an aluminum alloy.

* * * * *